United States Patent
Machida

(10) Patent No.: US 8,723,097 B2
(45) Date of Patent: May 13, 2014

(54) ILLUMINANCE SENSOR HAVING LIGHT-LEVEL-INDEPENDENT CONSUMPTION CURRENT

(75) Inventor: Satoshi Machida, Chiba (JP)

(73) Assignee: Seiko Instruments Inc., Chiba (JP)

( * ) Notice: Subject to any disclaimer, the term of this patent is extended or adjusted under 35 U.S.C. 154(b) by 483 days.

(21) Appl. No.: 13/082,058

(22) Filed: Apr. 7, 2011

(65) Prior Publication Data

US 2011/0260041 A1 Oct. 27, 2011

(30) Foreign Application Priority Data

Apr. 22, 2010 (JP) .................... 2010-099068

(51) Int. Cl.
- *H01J 40/14* (2006.01)
- *H03F 3/08* (2006.01)
- *G01J 1/44* (2006.01)

(52) U.S. Cl.
USPC ............. 250/214 R; 250/214 A; 250/214 C

(58) Field of Classification Search
USPC .......... 257/290, 294, 431, 435, 440, 461; 340/540, 555, 600; 327/514, 52, 63, 327/65; 330/252; 356/229, 215, 218, 222, 356/224, 225, 226; 250/214 R, 214.1, 214 A, 250/214 C, 226, 214 AL
See application file for complete search history.

(56) References Cited

U.S. PATENT DOCUMENTS

| | | | | |
|---|---|---|---|---|
| 4,533,257 A | * | 8/1985 | Kitano et al. | 368/202 |
| 5,059,809 A | * | 10/1991 | Fukuyama | 250/551 |
| 6,038,049 A | * | 3/2000 | Shimizu et al. | 398/210 |
| 6,919,549 B2 | * | 7/2005 | Bamji et al. | 250/208.1 |
| 7,189,953 B2 | * | 3/2007 | Machida | 250/208.1 |
| 2004/0246356 A1 | * | 12/2004 | Koyama | 348/308 |
| 2008/0237453 A1 | * | 10/2008 | Chen et al. | 250/226 |
| 2009/0160830 A1 | * | 6/2009 | Omi et al. | 345/204 |

FOREIGN PATENT DOCUMENTS

| | | | | |
|---|---|---|---|---|
| JP | 55158677 A | * | 12/1980 | H01L 31/00 |
| JP | 2006-148014 A | | 6/2006 | |

* cited by examiner

*Primary Examiner* — Que T Le
*Assistant Examiner* — Jennifer Bennett
(74) *Attorney, Agent, or Firm* — Brinks Gilson & Lione

(57) ABSTRACT

Provided is an illuminance sensor in which a consumption current is independent of an illuminance level of incident light. Amplifiers (21 to 24) and a subtraction circuit (25) are driven by a constant current source (not shown). The subtraction circuit (25) outputs a differential voltage between output voltages of a photodetector element (15) and a photodetector element (16). Based on the differential voltage, a sample/hold circuit (30) performs sampling or holding of a voltage at one end of a capacitor (13). A switch (28) is ON when an output voltage of the subtraction circuit (25) starts to change, thereby fixing the voltage at the one end of the capacitor (13) to a reference voltage.

9 Claims, 5 Drawing Sheets

ILLUMINANCE SENSOR HAVING LIGHT-LEVEL-INDEPENDENT CONSUMPTION CURRENT

RELATED APPLICATIONS

This application claims priority under 35 U.S.C. §119 to Japanese Patent Application No. 2010-099068 filed on Apr. 22, 2010, the entire content of which is hereby incorporated by reference.

BACKGROUND OF THE INVENTION

1. Field of the Invention

The present invention relates to an illuminance sensor of a voltage output type.

2. Description of the Related Art

A conventional illuminance sensor is described. FIG. 5 is a circuit diagram illustrating the conventional illuminance sensor.

Based on incident light, photodiodes PD1 and PD2 respectively cause photocurrents Ipd1 and Ipd2 to flow. A differential current between the photocurrent Ipd1, which is amplified by a current mirror circuit including NPN bipolar transistors 51 and 52, and the photocurrent Ipd2 is derived from a collector of a PNP bipolar transistor 53. This differential current is amplified by a current mirror circuit including PNP bipolar transistors 53 and 54, and the amplified current flows to the PNP bipolar transistor 54 as an output current Iout, which indicates the illuminance level of the incident light. The output current Iout is converted into a voltage by a resistor (not shown) (for example, see Japanese Patent Application Laid-open No. 2006-148014 (FIG. 4)).

However, in the conventional technology, when the illuminance of the incident light increases, the photocurrents Ipd1 and Ipd2 accordingly increase, and hence the output current Iout also increases. As a result, a consumption current of the illuminance sensor increases. In other words, the consumption current of the illuminance sensor depends on the illuminance level of the incident light.

SUMMARY OF THE INVENTION

The present invention has been made in view of the above-mentioned problem, and has an object to provide an illuminance sensor in which a consumption current is independent of an illuminance level of incident light.

In order to solve the above-mentioned problem, according to the present invention, there is provided an illuminance sensor of a voltage output type, including: a first photodetector element for outputting a photovoltage by causing a photocurrent based on incident light to flow; a second photodetector element; a subtraction circuit which is driven by a constant current source, for outputting a differential voltage between an output voltage of the first photodetector element and an output voltage of the second photodetector element; a sample/hold circuit; a capacitor having one end provided at an output terminal of the subtraction circuit and another end provided at an input terminal of the sample/hold circuit; and a switch provided between a node to which a reference voltage is supplied and the another end of the capacitor, the sample/hold circuit performing one of sampling and holding of a voltage at the another end of the capacitor based on the differential voltage.

According to the present invention, the consumption current of the illuminance sensor substantially depends on the current which is caused to flow by the constant current source for the subtraction circuit. Therefore, the consumption current becomes almost independent of the illuminance level of the incident light.

DETAILED DESCRIPTION OF THE PREFERRED EMBODIMENTS

Hereinafter, embodiments of the present invention are described with reference to the drawings.

First Embodiment

Figure 1:
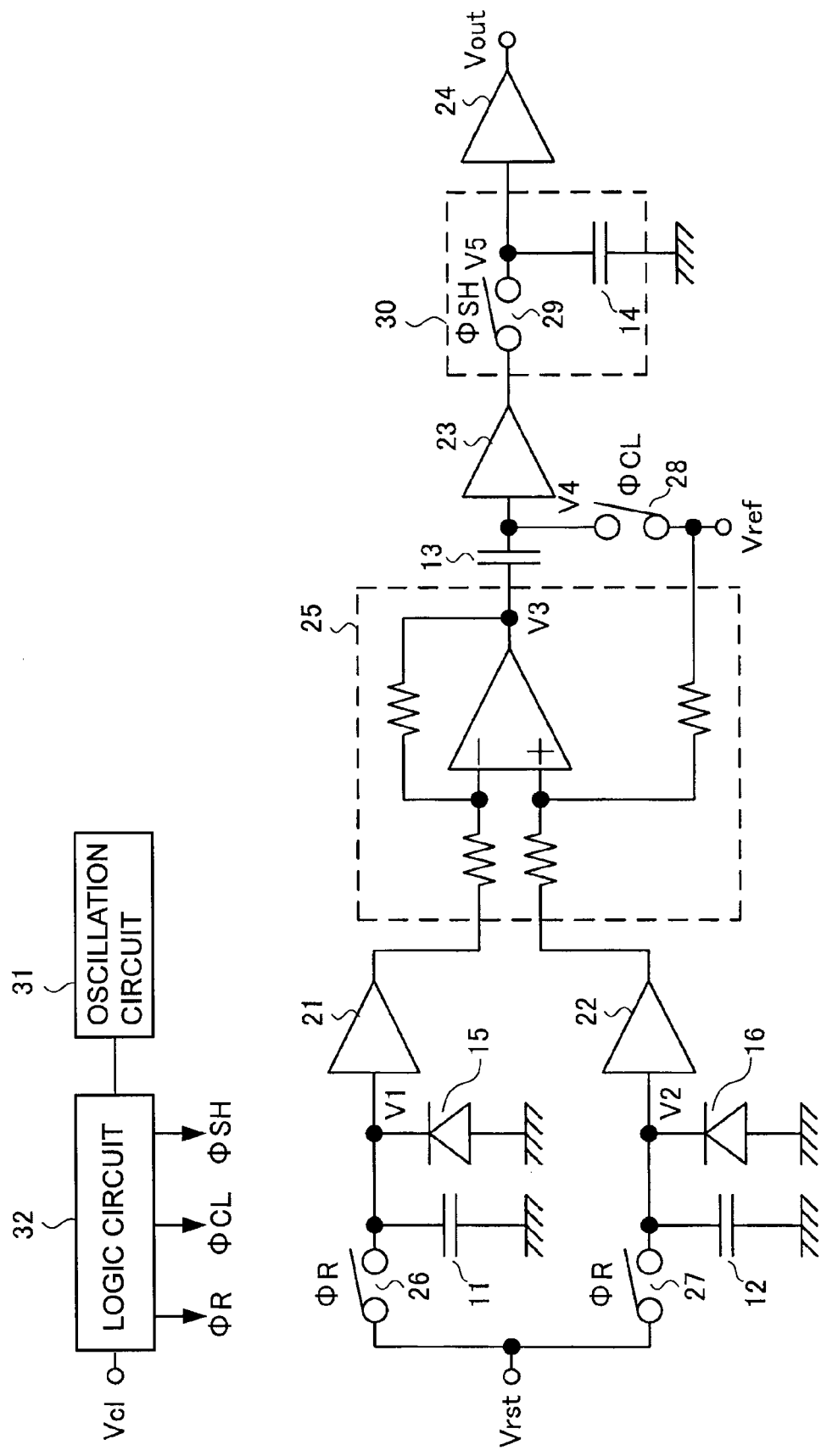
FIG. 1 is a circuit diagram illustrating an illuminance sensor according to a first embodiment of the present invention.

FIG. 1 is a circuit diagram illustrating an illuminance sensor according to a first embodiment of the present invention.

The illuminance sensor includes capacitors 11 to 13, photodetector elements 15 and 16, amplifiers 21 to 24, a subtraction circuit 25, switches 26 to 28, a sample/hold circuit 30, an oscillation circuit 31, and a logic circuit 32. Further, the illuminance sensor includes a reset terminal, a control terminal, an output terminal, and a reference voltage input terminal. The sample/hold circuit 30 includes a switch 29 and a capacitor 14. Further, the sample/hold circuit 30 includes an input terminal and an output terminal.

The switch 26 is provided between the reset terminal of the illuminance sensor and an input terminal of the amplifier 21. The capacitor 11 is provided between a ground terminal and a node between one end of the switch 26 and the input terminal of the amplifier 21. The photodetector element 15 is provided between the ground terminal and a node between the one end of the switch 26 and the input terminal of the amplifier 21. The switch 27 is provided between the reset terminal of the illuminance sensor and an input terminal of the amplifier 22. The capacitor 12 is provided between the ground terminal and a node between one end of the switch 27 and the input terminal of the amplifier 22. The photodetector element 16 is provided between the ground terminal and a node between the one end of the switch 27 and the input terminal of the amplifier 22.

The subtraction circuit 25 includes a non-inverting input terminal connected to an output terminal of the amplifier 22, an inverting input terminal connected to an output terminal of the amplifier 21, a reference voltage input terminal connected to the reference voltage input terminal of the illuminance sensor, and an output terminal connected to one end of the capacitor 13.

The switch 28 is provided between the reference voltage input terminal of the illuminance sensor and a node between another end of the capacitor 13 and an input terminal of the amplifier 23. The switch 29 is provided between an output terminal of the amplifier 23 and an input terminal of the amplifier 24. The capacitor 14 is provided between the ground terminal and a node between one end of the switch 29 and the input terminal of the amplifier 24. The amplifier 24 includes an output terminal connected to the output terminal of the illuminance sensor.

The logic circuit 32 includes an input terminal connected to an output terminal of the oscillation circuit 31, a control terminal connected to the control terminal of the illuminance sensor, a first output terminal which outputs a signal ΦR for controlling the switches 26 and 27, a second output terminal which outputs a signal ΦCL for controlling the switch 28, and a third output terminal which outputs a signal ΦSH for controlling the switch 29.

Here, a voltage at the input terminal of the amplifier 21 is defined as a photovoltage V1. A voltage at the input terminal of the amplifier 22 is defined as an output voltage V2. A voltage at the output terminal of the subtraction circuit 25 is defined as a voltage V3. A voltage at the input terminal of the amplifier 23 is defined as a voltage V4. A voltage at the input terminal of the amplifier 24 is defined as a voltage V5. A voltage at the reset terminal of the illuminance sensor is defined as a reset voltage Vrst. A voltage at the control terminal of the illuminance sensor is defined as a voltage Vcl. A voltage at the output terminal of the illuminance sensor is defined as an output voltage Vout. A voltage at the reference voltage input terminal of the illuminance sensor is defined as a reference voltage Vref.

The photodetector elements 15 and 16 are respectively formed of p-n junctions having the same depth, which enable detection of incident light having a wavelength based on human visual sensitivity. Further, the photodetector elements 15 and 16 are formed of photodiodes or phototransistors.

The photodetector element 15 includes an IR/UV cut filter (not shown) which passes only incident light having a wavelength based on human visual sensitivity. By causing a photocurrent to flow based on the incident light, the photodetector element 15 outputs the photovoltage V1. Further, the photodetector element 16 includes a light shielding filter (not shown), and does not cause a photocurrent to flow.

The photodetector elements 15 and 16 respectively allow leakage currents to flow. Further, in some cases, the photodetector elements 15 and 16 respectively allow unintended currents to flow due to false detection of infrared light applied to a side surface of an IC forming the illuminance sensor. Here, because the photodetector elements 15 and 16 are formed in the same manufacturing process and in the same shape, the photodetector elements 15 and 16 allow substantially the same leakage current to flow, and also the photodetector elements 15 and 16 allow substantially the same unintended current to flow.

The amplifiers 21 to 24 and the subtraction circuit 25 are driven by a constant current source (not shown). The subtraction circuit 25 outputs a differential voltage between the output voltages of the photodetector element 15 and the photodetector element 16. The sample/hold circuit 30 performs sampling or holding of a voltage at the another end of the capacitor 13, which is based on the differential voltage. The switch 28 is ON when the output voltage of the subtraction circuit 25 starts to change, thereby fixing the voltage of the another end of the capacitor 13 to the reference voltage.

Figure 2:
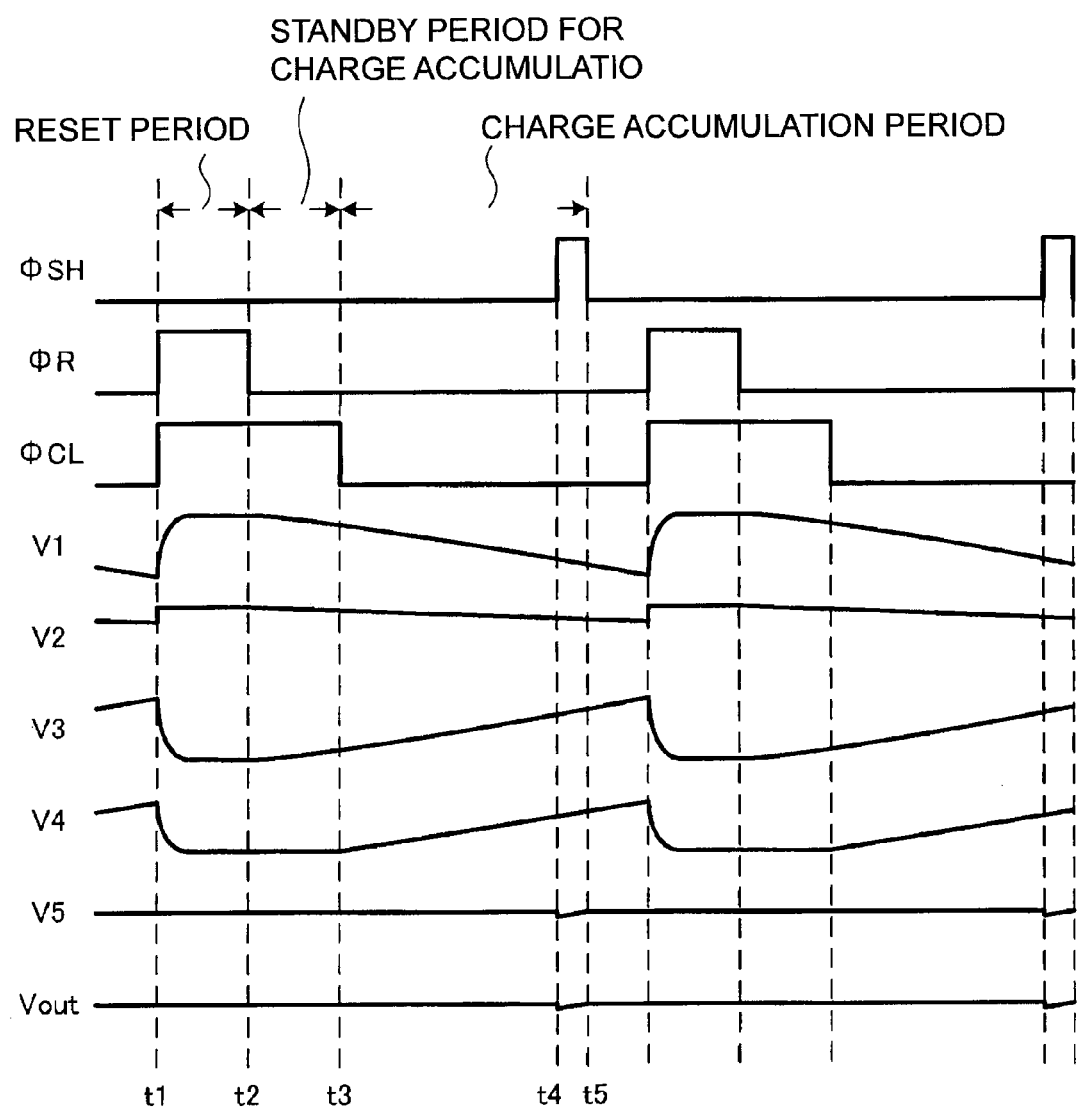
FIG. 2 is a time chart of respective voltages in the illuminance sensor of the first embodiment.

Next, operation of the illuminance sensor is described. FIG. 2 is a time chart of respective voltages in the illuminance sensor of the first embodiment. Here, for the sake of convenience, description is given assuming that each of the amplifiers 21 to 24 and the subtraction circuit 25 has unity gain.

At time t=t1, the logic circuit 32 operates so that the signal ΦSH becomes LOW level. Then, the switch 29 is turned OFF. The voltage V5 and the output voltage Vout do not change. That is, when the signal ΦSH is at LOW level, the voltage V5 and the output voltage Vout are held.

The logic circuit 32 operates so that the signal ΦR becomes HIGH level. Then, the switches 26 and 27 are turned ON. At this time, the photovoltage V1 starts to increase toward the reset voltage Vrst based on the on-resistance of the switch 26 and the capacitor 11. Further, the output voltage V2 also starts to increase toward the reset voltage Vrst based on the on-resistance of the switch 27 and the capacitor 12. Here, because the voltage V3 is a voltage obtained by subtracting the photovoltage V1 from the output voltage V2 by the subtraction circuit 25, the voltage V3 starts to decrease toward the reference voltage Vref.

The logic circuit 32 operates so that the signal ΦCL becomes HIGH level. Then, the switch 28 is turned ON. The voltage V4 starts to decrease toward the reference voltage Vref based on the on-resistance of the switch 28 and the capacitor 13.

At time t1<t<t2 (photodetection reset period), the logic circuit 32 operates so that the signal ΦSH is maintained at LOW level. Therefore, the voltage V5 and the output voltage Vout remain unchanged. That is, when the signal ΦSH is at LOW level, the voltage V5 and the output voltage Vout are held.

The logic circuit 32 operates so that the signal ΦR is maintained at HIGH level. Therefore, because the signal ΦR is maintained at HIGH level, the photovoltage V1 and the output voltage V2 can sufficiently become the reset voltage Vrst. Further, the voltage V3 can also sufficiently become the reference voltage Vref.

The logic circuit 32 operates so that the signal ΦCL is maintained at HIGH level. Therefore, because the signal ΦCL is maintained at HIGH level, the voltage V4 can sufficiently become the reference voltage Vref.

At time t=t2, the logic circuit 32 operates so that the signal ΦSH is maintained at LOW level. Therefore, the voltage V5 and the output voltage Vout remain unchanged. That is, when the signal ΦSH is at LOW level, the voltage V5 and the output voltage Vout are held.

The logic circuit 32 operates so that the signal ΦR becomes LOW level. Then, the switches 26 and 27 are turned OFF. At this time, the photovoltage V1 starts to decrease from the reset voltage Vrst based on the photocurrent generated by the incident light, the leakage current, the unintended current, and the capacitor 11. Further, the output voltage V2 also starts to decrease from the reset voltage Vrst based on the leakage current, the unintended current, and the capacitor 12. Further, because the voltage V3 is a voltage obtained by subtracting the photovoltage V1 from the output voltage V2 by the subtraction circuit 25, the voltage V3 starts to increase.

Here, the photodetector elements 15 and 16 allow substantially the same leakage current to flow, and further, the photodetector elements 15 and 16 allow substantially the same unintended current to flow. Therefore, a voltage drop of the photovoltage V1 and a voltage drop of the output voltage V2 due to those currents are substantially the same. The subtraction circuit 25 outputs the voltage V3 by subtracting the photovoltage V1 from the output voltage V2, and hence the voltage drops described above are cancelled in the voltage V3. Therefore, very little influence from the leakage current and the unintended current is seen in the voltage V3. That is, the voltage V3 is a voltage based on only the photocurrent.

The logic circuit 32 operates so that the signal ΦCL is maintained at HIGH level. Therefore, the voltage V4 is maintained at the reference voltage Vref.

At time t2<t<t3 (standby period for charge accumulation by photodetection), the logic circuit 32 operates so that the signal ΦCL is maintained at HIGH level. Therefore, the voltage V4 is maintained at the reference voltage Vref.

During this period, the voltage V3, which is the output voltage of the subtraction circuit 25, starts to increase based on the photocurrent generated by the incident light. However, the voltage V3 is in an increase start state, and the behavior of the subtraction circuit 25 is unstable. Therefore, the voltage V4 is fixed to the reference voltage Vref, and the voltage V3 in this period is not monitored.

At time t=t3, the logic circuit 32 operates so that the signal ΦSH is maintained at LOW level. Therefore, the voltage V5 and the output voltage Vout remain unchanged. That is, when the signal ΦSH is at LOW level, the voltage V5 and the output voltage Vout are held.

The logic circuit 32 operates so that the signal ΦR is maintained at LOW level. Therefore, the photovoltage V1 and the output voltage V2 continue to decrease. Further, the voltage V3 continues to increase.

The logic circuit 32 operates so that the signal ΦCL becomes LOW level. Then, the switch 28 is turned OFF. Therefore, the voltage V4 starts to increase from the reference voltage Vref based on the voltage V3 and the capacitor 13.

At time t3<t<t4 (charge accumulation period by photodetection), the logic circuit 32 operates so that the signal ΦCL is maintained at LOW level. Therefore, the voltage V4 continues to increase.

During this period, the voltage V3, which is the output voltage of the subtraction circuit 25, increases based on the photocurrent generated by the incident light. A predetermined time period (time period from time t2 to time t3) has elapsed since the increase of the voltage V3 started, and hence the behavior of the subtraction circuit 25 becomes stable. Therefore, the voltage V4 based on the photocurrent has high accuracy.

At time t4≤t<t5 (charge accumulation period by photodetection), the logic circuit 32 operates so that the signal ΦSH becomes HIGH level. Then, the switch 29 is turned ON, and the capacitor 14 performs sampling of the output voltage, which is output after amplification of the voltage V4 by the amplifier 23, as the voltage V5. The amplifier 24 amplifies the voltage V5 and outputs the output voltage Vout.

Here, timings of the signal ΦSH are controlled by the voltage Vcl from the control terminal. When the timing at which the signal ΦSH becomes HIGH level is delayed, the charge accumulation period becomes accordingly long, which enables to increase sensitivity of the illuminance sensor.

Note that, when capacity values of the capacitors 11 and 12 are small, accordingly, the photovoltage V1 and the output voltage V2 easily change, and hence sensitivity of the illuminance sensor increases.

At time t=t5, the logic circuit 32 operates so that the signal ΦSH becomes LOW level. Then, the switch 29 is turned OFF, and the voltage V5 and the output voltage Vout are fixed based on the voltage V4. That is, when the signal ΦSH is at LOW level, the voltage V5 and the output voltage Vout are held. The output voltage Vout at this time is based on the photocurrent generated by the incident light having a wavelength based on human visual sensitivity, and hence the output voltage Vout has spectral sensitivity characteristics based on human visual sensitivity.

In this case, the consumption current of the illuminance sensor substantially depends on the current which is caused to flow by the constant current source for the amplifiers 21 to 24 and the subtraction circuit 25. Therefore, the consumption current becomes almost independent of the illuminance level of the incident light.

Further, the photocurrent of the photodetector element 15 flows not from a power supply terminal but from one end of the capacitor 11 to the ground terminal, and hence the photocurrent does not contribute to the consumption current of the illuminance sensor. Therefore, the consumption current of the illuminance sensor becomes independent of the illuminance level of the incident light.

Further, the illuminance sensor outputs the output voltage Vout, and hence a resistor for current/voltage conversion is unnecessary at the output terminal of the illuminance sensor.

Note that, although not shown, the amplifiers 21 to 24 may be source followers.

Further, although not shown, by adding a circuit for generating the reference voltage Vref from the reset voltage Vrst, the reference voltage input terminal of the illuminance sensor may be eliminated. Further, although not shown, by adding a circuit for generating the reset voltage Vrst from the reference voltage Vref, the reset terminal of the illuminance sensor may be eliminated.

Further, the photodetector elements 15 and 16 are respectively formed of p-n junctions having the same depth, and the subtraction circuit 25 calculates the differential voltage between the output voltages of those photodetector elements 15 and 16. In this manner, the leakage currents flowing through the photodetector elements 15 and 16 are cancelled, and the unintended currents flowing through the photodetector elements 15 and 16 are also cancelled. Alternatively, however, the photodetector elements 15 and 16 may be respectively formed of p-n junctions which are different in depth. At this time, the photodetector elements 15 and 16 each detect various types of incident light and output the output voltages, and the subtraction circuit 25 calculates the differential voltage between the output voltages of those photodetector elements 15 and 16. In this manner, the incident light having a wavelength based on human visual sensitivity is detected.

Second Embodiment

Figure 3:
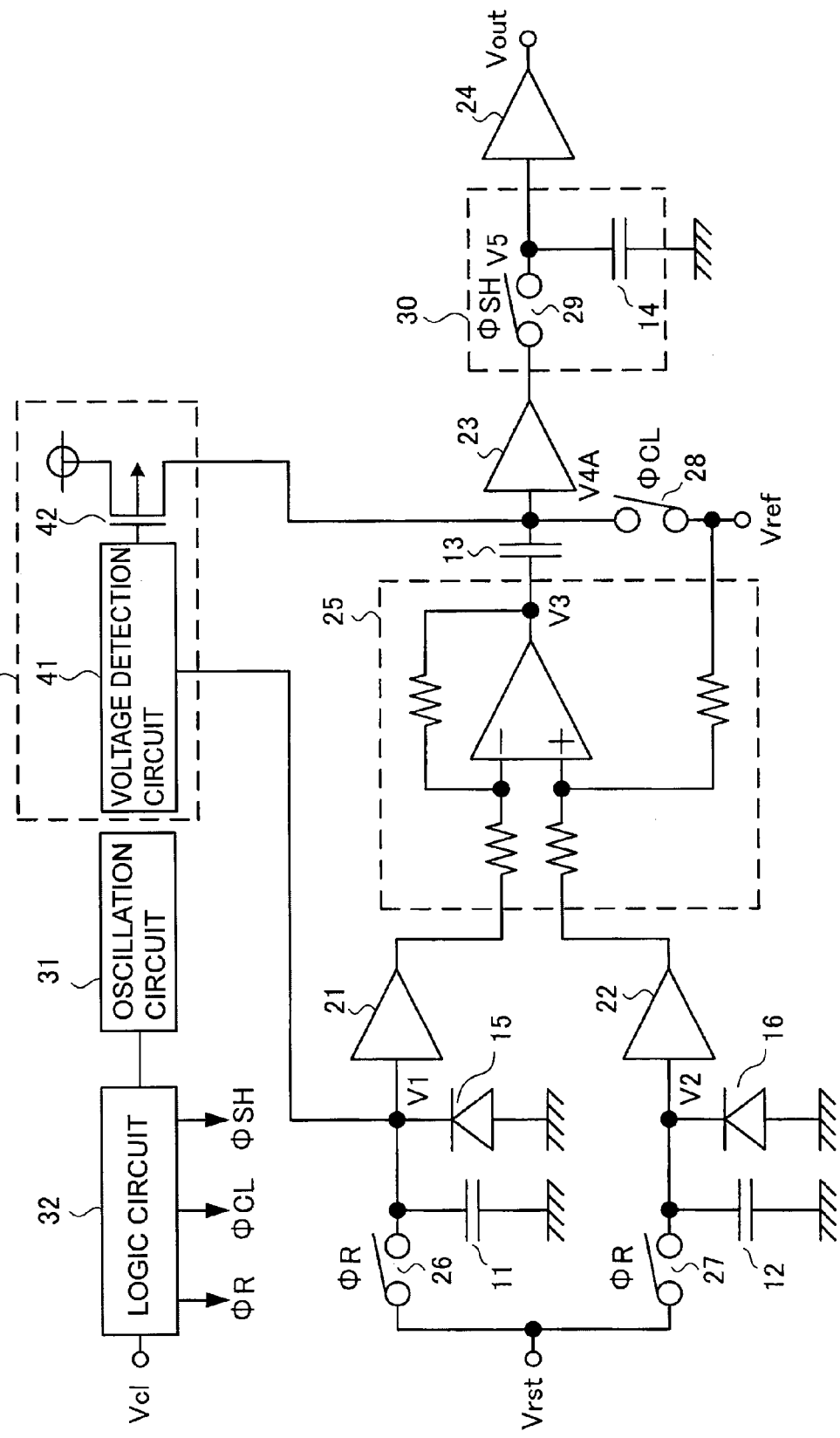
FIG. 3 is a circuit diagram illustrating an illuminance sensor according to a second embodiment of the present invention.

FIG. 3 is a circuit diagram illustrating an illuminance sensor according to a second embodiment of the present invention.

Compared with the illuminance sensor of the first embodiment, a control circuit 40 is added in the illuminance sensor of the second embodiment. The control circuit 40 includes a voltage detection circuit 41 and a PMOS transistor 42.

The control circuit 40 includes an input terminal connected to the node between the one end of the switch 26 and the input terminal of the amplifier 21, and an output terminal connected to the node between the another end of the capacitor 13 and the input terminal of the amplifier 23. The voltage detection circuit 41 includes an input terminal connected to the input terminal of the control circuit 40. The PMOS transistor 42 includes a gate connected to an output terminal of the voltage detection circuit 41, a source connected to a power supply terminal, and a drain connected to the output terminal of the control circuit 40.

Here, the voltage at the input terminal of the amplifier 23 is defined as a voltage V4A.

The voltage detection circuit 41 includes an inverter (not shown) with a saturation voltage of the photovoltage V1 as a threshold voltage thereof, or a comparator (not shown) with the saturation voltage of the photovoltage V1 as a reference voltage thereof. The PMOS transistor 42 is of an open drain type. The control circuit 40 detects that the photovoltage V1 has reached the saturation voltage, and fixes the output voltage Vout of the illuminance sensor.

Figure 4:
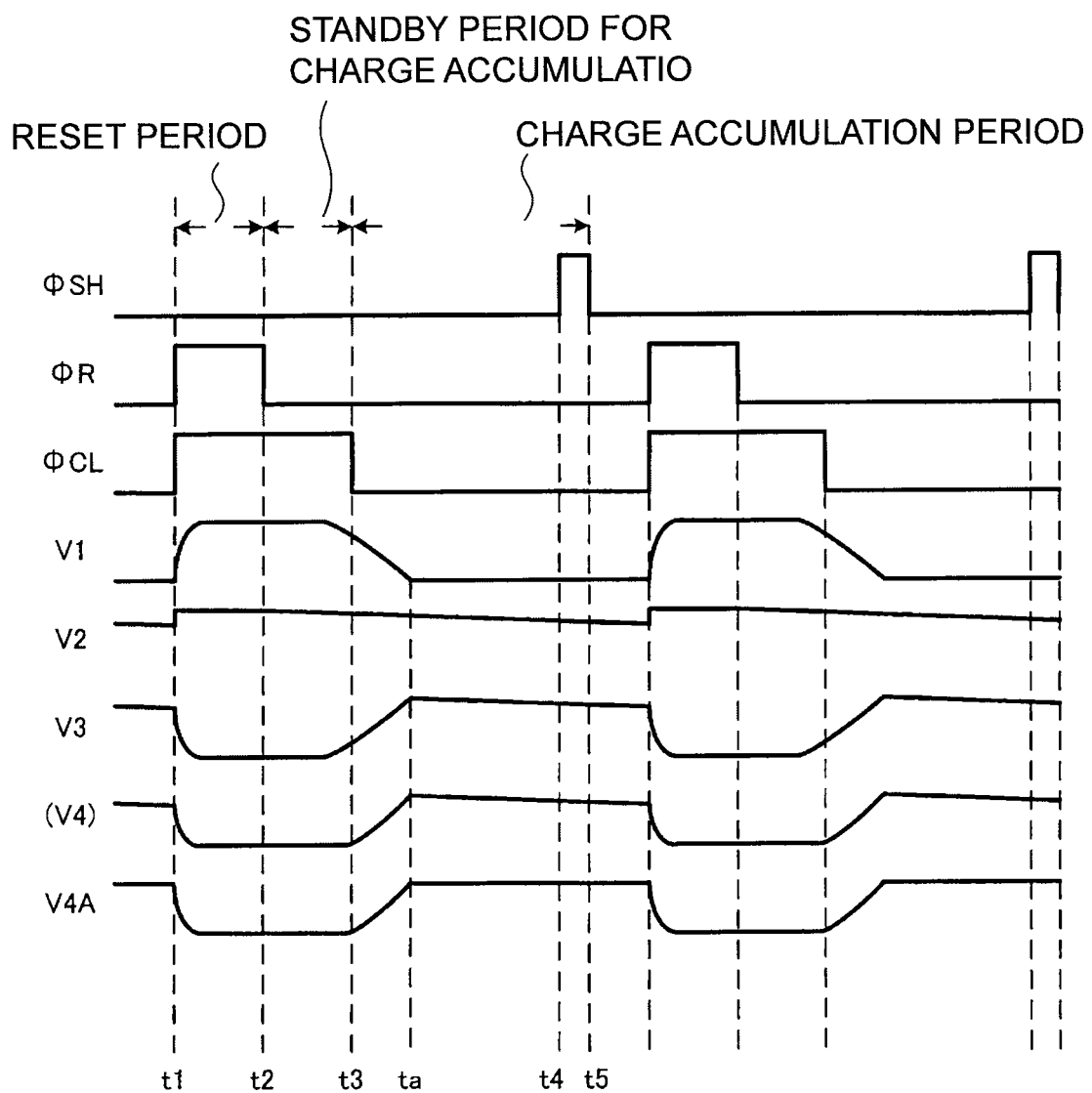
FIG. 4 is a time chart of respective voltages in the illuminance sensor of the second embodiment.
Figure 5:
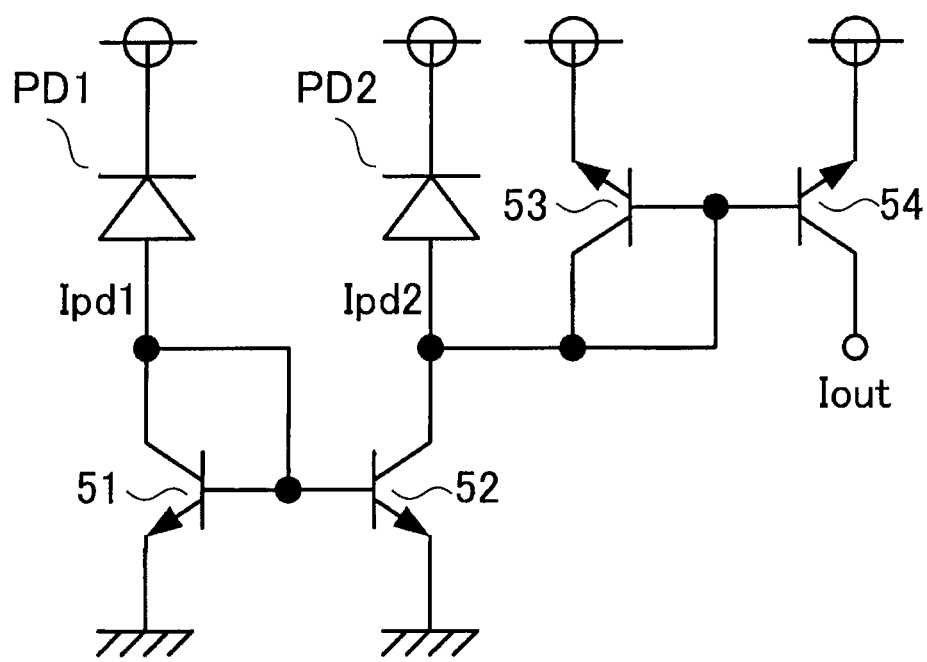
FIG. 5 is a circuit diagram illustrating a conventional illuminance sensor.

Next, operation of the illuminance sensor is described. FIG. 4 is a time chart of respective voltages of the illuminance sensor of the second embodiment.

Here, it is assumed that incident light having illuminance higher than a predetermined value enters the photodetector element 15, and the photovoltage V1 is saturated during the charge accumulation period.

At time t3<t<ta, the photovoltage V1 sharply decreases based on the photocurrent generated by the incident light, the leakage current, the unintended current, and the capacitor 11. Further, the output voltage V2 also decreases based on the leakage current, the unintended current, and the capacitor 12. Further, because the voltage V3 is a voltage obtained by subtracting the photovoltage V1 from the output voltage V2 by the subtraction circuit 25, the voltage V3 sharply increases. Further, the voltage V4A sharply increases based on the voltage V3 and the capacitor 13.

At time t=ta, the photovoltage V1 reaches the saturation voltage after the sharp decrease. The voltage detection circuit 41 monitors the photovoltage V1. When the voltage detection circuit 41 detects that the photovoltage V1 has reached the saturation voltage, the voltage detection circuit 41 outputs a LOW level signal to the gate of the PMOS transistor 42. Then, the PMOS transistor 42 is turned ON, and the voltage V4A is forcibly fixed to a power supply voltage VDD. Therefore, the output voltage of the amplifier 23, the voltage V5, and the output voltage Vout are all fixed.

Here, when the photovoltage V1 reaches the saturation voltage and becomes constant due to the incident light having illuminance higher than the predetermined value, because the output voltage V2 is decreasing, the voltage V3 (V3=V2−V1) adversely starts to decrease. Then, in a case of the first embodiment in which the control circuit 40 including the voltage detection circuit 41 and the PMOS transistor 42 is absent, the voltage V4 also adversely starts to decrease based on the voltage V3. That is, although the voltage V4 is required to increase to reach the saturation level in accordance with the illuminance level of the incident light, in the case of the first embodiment, when the illuminance of the incident light is higher than the predetermined value, the voltage V4 adversely decreases from the saturation level. Therefore, the illuminance sensor cannot maintain the saturation level of the output voltage Vout. Here, in the case of the second embodiment, when the illuminance of the incident light is higher than the predetermined value, the voltage V4A is forcibly fixed to the power supply voltage VDD. Therefore, the illuminance sensor can maintain the saturation level of the output voltage Vout. That is, the incident light having illuminance higher than the predetermined value is detected as incident light having maximum illuminance in a range detectable in the illuminance sensor.

With this, even if the illuminance of the incident light is higher than a predetermined value, the illuminance sensor does not suffer from false detection of the incident light.

Note that, in FIG. 3, the voltage detection circuit 41 monitors the input terminal of the amplifier 21. However, although not shown, the voltage detection circuit 41 may monitor the output terminal of the amplifier 21. At this time, the voltage detection circuit 41 monitors the output voltage of the amplifier 21. By detecting that the output voltage of the amplifier 21 has fallen below a predetermined voltage, the voltage detection circuit 41 determines that the photovoltage V1 has reached the saturation voltage. Further, although not shown, the voltage detection circuit 41 may monitor the output terminal of the subtraction circuit 25. At this time, the voltage detection circuit 41 monitors the voltage V3, which is the output voltage of the subtraction circuit 25. By detecting that the voltage V3 has exceeded the predetermined voltage, the voltage detection circuit 41 determines that the photovoltage V1 has reached the saturation voltage.

Further, in FIG. 3, the voltage detection circuit 41 forcibly fixes the voltage V4A to the power supply voltage VDD. However, although not shown, any one of the output voltage of the amplifier 23, the voltage V5, and the output voltage Vout may be fixed to the power supply voltage VDD.

What is claimed is:

1. An illuminance sensor of a voltage output type, comprising:
   a first photodetector element for outputting a photovoltage based on incident light;
   a second photodetector element;
   a subtraction circuit that is driven by a constant current source, for outputting a differential voltage between an output voltage of the first photodetector element and an output voltage of the second photodetector element;
   a sample/hold circuit;
   a capacitor having a first electrode coupled to an output terminal of the subtraction circuit and a second electrode coupled to an input terminal of the sample/hold circuit; and
   a switch provided between a node to which a reference voltage is supplied and the second electrode of the capacitor,
   the sample/hold circuit performing one of sampling and holding of a voltage at the second electrode of the capacitor based on the differential voltage,
   wherein a consumption current of the illuminance sensor is substantially independent of an illuminance level of the incident light.

2. An illuminance sensor according to claim 1, wherein:
   the first photodetector element includes a filter for passing only incident light having a wavelength based on human visual sensitivity;
   the second photodetector element includes a light shielding filter; and
   the first photodetector element and the second photodetector element are respectively formed of p-n junctions having the same depth.

3. An illuminance sensor according to claim 1, wherein the first photodetector element and the second photodetector element are respectively formed of p-n junctions which are different in depth.

4. An illuminance sensor according to claim 1, wherein the switch is ON when an output voltage of the subtraction circuit starts to change, to thereby fix the voltage at the another end of the capacitor to the reference voltage.

5. An illuminance sensor according to claim 1, further comprising a control circuit for detecting that the photovoltage has reached a saturation voltage and for fixing an output voltage of the illuminance sensor.

6. An illuminance sensor according to claim 5, wherein the control circuit comprises:
   a voltage detection circuit including an inverter; and
   a PMOS transistor of an open drain type, which includes a gate connected to an output terminal of the voltage detection circuit and a source connected to a power supply terminal.

7. An illuminance sensor according to claim 5, wherein the control circuit comprises:
   a voltage detection circuit including a comparator; and
   a PMOS transistor of an open drain type, which includes a gate connected to an output terminal of the voltage detection circuit and a source connected to a power supply terminal.

8. An illuminance sensor according to claim 1 further comprising a first amplifier coupled to the first photodetector element and a second amplifier coupled to an output terminal of the illuminance sensor, wherein the first and second amplifiers are driven by the constant current source.

9. An illuminance sensor according to claim 4 further comprising a logic circuit coupled to the switch and to the sample/hold circuit.

* * * * *